June 19, 1951     J. B. ARMITAGE ET AL     2,557,405
ADJUSTABLE BEARING
Original Filed Aug. 1, 1942
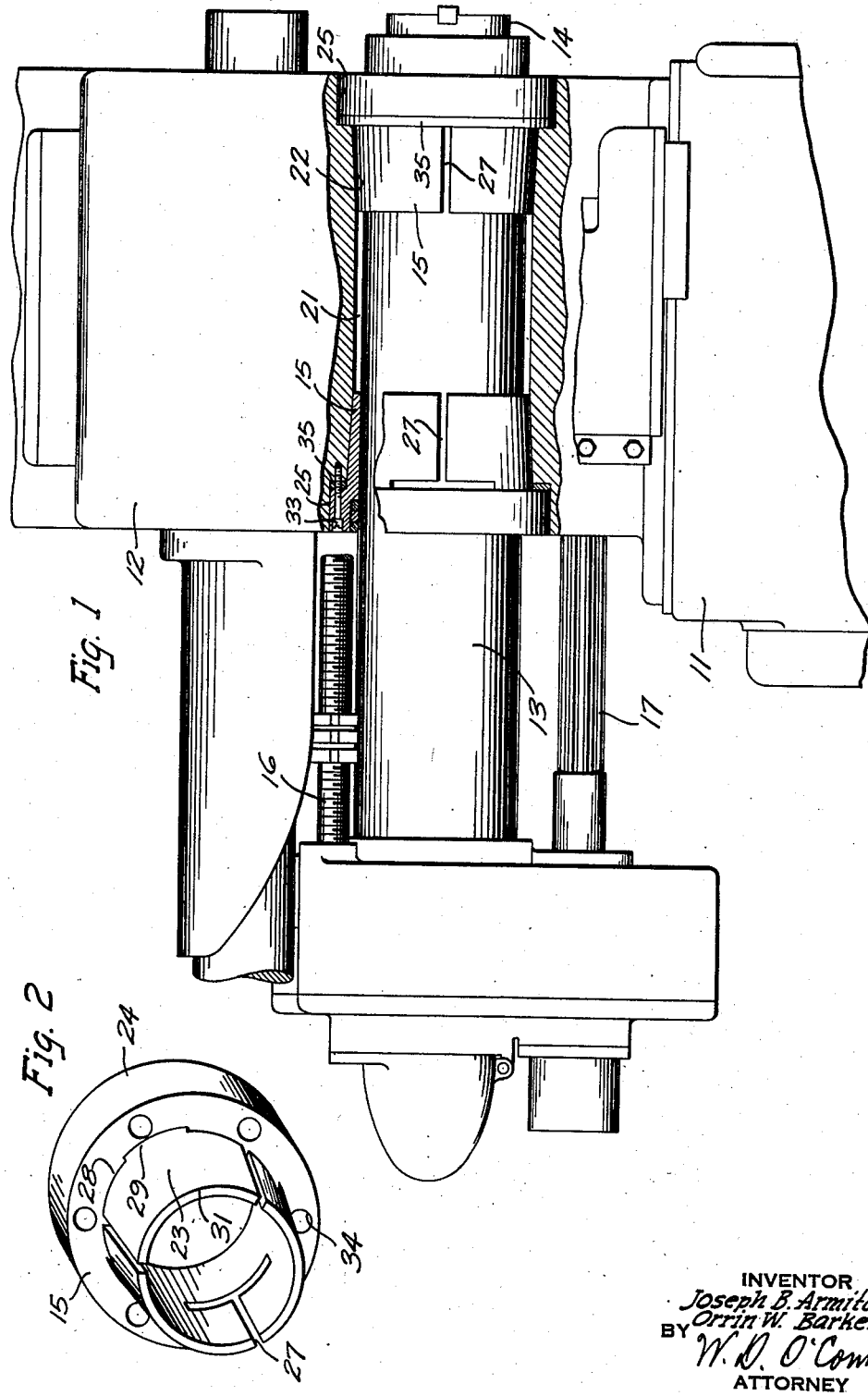
INVENTOR
Joseph B. Armitage
Orrin W. Barker
BY
W. D. O'Connor
ATTORNEY Patented June 19, 1951

2,557,405

UNITED STATES PATENT OFFICE 2,557,405

ADJUSTABLE BEARING

Joseph B. Armitage, Wauwatosa, and Orrin W. Barker, Milwaukee, Wis., assignors to Kearney & Trecker Corporation, West Allis, Wis., a corporation of Wisconsin Original application August 1, 1942, Serial No. 453,228. Divided and this application November 8, 1945, Serial No. 627,364

3 Claims. (Cl. 308—71)

This invention relates generally to improvements in bearings and more particularly to improved adjustable sleeve bearings for rigidly supporting a movable machine element.

The present application is a division of application, Serial No. 453,228, filed August 1, 1942, now abandoned, which, in turn, was a continuation-in-part of application Serial No. 220,648 filed July 22, 1938, that resulted in U. S. Patent No. 2,293,880 dated August 25, 1942.

A general object of the invention is to provide an improved adjustable sleeve bearing.

Another object of the invention is to provide an improved bearing especially adapted to support a movable member rigidly in accurately predetermined position.

Another object of the invention is to provide a novel resilient bearing sleeve, together with improved means for effecting radial adjustment of the sleeve.

Another object is to provide an improved arrangement for affording resiliency in an adjustable bearing sleeve.

According to this invention, an adjustable sleeve bearing is constituted by a bearing block presenting a tapered socket, together with a resilient bearing sleeve of frusto-conical shape, complementary to and fitting within the socket. To afford resiliency, the sleeve is slotted longitudinally inward from its tapered edge with each longitudinal slot intersecting a circumferential slot, the latter being spaced at their ends to provide resilient necks. Means are provided for effecting axial adjustment of the sleeve within the socket to cause deflection of the elements between the slots in establishing the desired inner diameter.

The foregoing and other objects of the invention, which will become apparent from the following description, may be achieved by means of the particular bearing structure that is depicted in and described in connection with the accompanying drawing, in which:

Figure 1 is a fragmentary view, partly in vertical longitudinal section, showing a milling machine spindle head and supporting column with a spindle quill slidably mounted in the head by means of adjustable sleeve bearings embodying the present invention; and Fig. 2 is a view, in perspective, of one of the resilient bearing sleeves shown in Fig. 1.

The particular machine tool structure shown in Fig. 1, as exemplifying apparatus incorporating bearings constructed in accordance with the principles of the present invention, is the upper part of a milling machine of the bed type, although it is to be understood that the invention may be applied, with equal advantage, to any other machine.

The milling machine partially illustrated in the drawing is shown and described in full in the previously mentioned U. S. Patent No. 2,293,880.

Referring more specifically to Fig. 1, the portion of the milling machine there shown comprises a bed and upright structure 11, constituting the supporting column for a vertically movable spindle supporting block or head 12 that is slidably mounted therein in a well known manner. The spindle head 12, in turn, carries a horizontally disposed cylindrical spindle quill or ram 13 within which is rotatably mounted a tool-carrying spindle 14. To provide for axial feeding movement of the spindle 14, the quill 13 is slidably mounted for longitudinal movement in the head 12 by means of a pair of adjustable sleeve bearings 15, which embody the present invention. Longitudinal feeding movement of the quill may be effected in the usual manner by means of a threaded feed screw 16, and power may be transmitted to rotate the spindle 14 by means of a splined shaft 17, without interfering with the sliding movement of the quill.

As appears in Fig. 1, the axially movable quill 13 passes through a bore 21 in the spindle block 12, the ends of which present flared or tapered conical sockets 22 for receiving the adjustable sleeve bearings 15. As best shown in Fig. 2, each adjustable bearing sleeve or bushing presents a frusto-conical quill engaging portion 23, the outer surface of which is tapered complementary to, and fits within, the tapered socket 22 while the inner surface is cylindrical to engage the cylindrical sliding surface of the quill 13. At the base of the frusto-conical quill engaging portion, the sleeve 15 is provided with a flange or collar 24 arranged to fit within a counterbore 25 in the end of the quill receiving bore 21.

In order that the bearing sleeve 15 may be adjusted radially into close engagement with the quill 13, the frusto-conical quill receiving portion thereof is provided with a plurality of longitudinally disposed slots 27 extending from the tapered edge thereof inwardly, the slots being angularly disposed about the sleeve, as shown in Fig. 2. At its inner end, each longitudinal slot 27 medially intersects a transverse arcuate slot 28 that extends circumferentially of the sleeve adjacent to the flange 24. The ends of the several circumferential slots 28 are spaced to provide, between them, narrow resilient necks 29, whereby relatively large segmental bearing members or shoes 31 are freed for resilient radial deflection in effecting adjustment of the bearing.

As best shown in Fig. 1, the outer tapered surface of each bearing sleeve 15 engages the corresponding tapered socket 22 in the end of the bore 21, in such manner that inward axial movement of the sleeve results in contraction or radially inward deflection of the bearing shoes 31, causing their cylindrical inner surfaces to fit with and engage more closely the cylindrical outer surface of the quill 13. For forcing the sleeve 15 into the socket 22, there are provided a plurality of retaining cap screws 33, which pass through axially disposed holes 34, equally spaced about the flange 24 of the sleeve 15, the cap screws having threaded engagement with suitable tapped openings in the bottom of the counterbore 25 in the spindle block 12.

In order to provide for adjusting the engagement of the sleeve 15 with the quill 13 to effect the desired sliding relationship therebetween, shims 35 are interposed between the flange 24 of the sleeve and the bottom of the counterbore 25 for positioning the sleeve axially by limiting its inward adjusting movement. By adjusting the total thickness of the shims 35, in a well known manner, the distance which the sleeve 15 may be moved into the tapered socket 22 by the cap screws 33 and the resulting degree of engagement between the resilient sleeve and the quill 13 may be regulated precisely.

The two bearing sleeves at the respective ends of the bore 21 in the head 12 may be adjusted individually in the manner described, from time to time, to take up any wear which may occur between the sleeves and the quill.

From the foregoing explanation of the construction and operation of the improved adjustable sleeve bearing provided by the present invention, it may be readily appreciated that the improved bearing provides means for effecting and readily maintaining any desired degree of bearing engagement with a movable member, such as a machine tool quill, in order to support it and a tool spindle carried by it in rigid accurate alignment with other elements of a machine tool.

Although the foregoing description and the accompanying drawing are directed to a particular embodiment of the invention in an improved sleeve bearing for rigidly and accurately carrying a slidable quill or ram of a machine tool, it is to be understood that the particular structure set forth is intended only to be illustrative of one operative embodiment of the invention, it being contemplated that the bearing may be incorporated in other structural forms without departing from the spirit and scope of the invention, as defined in the subjoined claims.

The principles of the invention having now been fully explained in connection with the foregoing description of an illustrative embodying structure, we hereby claim as our invention:

1. An adjustable sleeve bearing comprising a supporting structure presenting a tapered bearing sleeve receiving bore, a cooperating bearing sleeve of frusto-conical shape presenting an external tapered surface adapted to be received within said tapered bore and a cylindrical internal surface adapted to cooperate with a relatively movable journal, said sleeve being attached at its base to a radially extending flange by integral resilient necks disposed between the ends of a plurality of circumferential kerfs between said sleeve and said flange, said sleeve being divided into radially deflectable segments by longitudinal kerfs extending from the middle of each circumferential kerf to the tapered end of said sleeve, and clamping means arranged to engage said flange and said supporting structure in manner to force said frusto-conical sleeve into said tapered bore, the arrangement being such that as said sleeve is forced into said bore its deflectable segments contract into engagement with the cooperating journal.

2. In an improved sleeve bearing, a supporting frame presenting a tapered bearing receiving bore, a bearing adapted to fit in said bore including an annular flange arranged to be clamped to said frame and having extending therefrom a coaxial frusto-conical sleeve presenting a tapered outer surface adapted to be received in said tapered bore and a cylindrical inner surface adapted to receive a cooperating journal, said sleeve being attached to said flange by narrow resilient necks defined by the ends of a plurality of circumferential kerfs between said flange and said sleeve and being divided into radially resilient segments by longitudinal kerfs extending from the midpoints of said circumferential kerfs to the tapered end of said sleeve, clamping means arranged to clamp said annular flange to said frame, and adjustable shims disposed between said flange and said frame, the arrangement being such that when said frusto-conical sleeve is forced into said tapered bore by action of said clamping means said resilient segments deflect into engagement with a cooperating journal the degree of engagement being adjustable by adjusting the thickness of said shims between said flange and said frame.

3. An improved bearing adapted to be received in a tapered bore and presenting a cylindrical internal journal receiving surface, said bearing comprising an annular flange and an integral frusto-conical sleeve extending coaxially from said flange as a base with its inner surface adapted to receive a cylindrical journal and its outer surface adapted to enter a tapered bore, said sleeve being divided into radially deflectable segments by a plurality of longitudinal slots extending from said flange to the tapered end of said sleeve and intersecting circumferential slots between said flange and said sleeve segments which extend equal distances in opposite directions from said longitudinal slots leaving resilient necks between the ends thereof constituting connecting members between said flange and said sleeve segments, the arrangement being such that when said frusto-conical sleeve is forced into a complementary tapered bore by pressure on said flange said sleeve segments are deflected radially inward to engage the inner cylindrical surfaces thereof with adjusted equalized bearing pressure upon a cooperating journal.

JOSEPH B. ARMITAGE.
ORRIN W. BARKER.

REFERENCES CITED

The following references are of record in the file of this patent:

UNITED STATES PATENTS

| Number | Name | Date |
| --- | --- | --- |
| 1,988,520 | Sinclair | Jan. 22, 1935 |
| 2,034,221 | Armitage | Mar. 17, 1936 |